(12) United States Patent
Danev et al.

(10) Patent No.: US 11,489,680 B2
(45) Date of Patent: Nov. 1, 2022

(54) METHOD, DEVICE AND SYSTEM FOR SECURE DISTANCE MEASUREMENT

(71) Applicant: 3DB Access AG, Thalwil (CH)

(72) Inventors: Boris Danev, Thalwil (CH); David Barras, Thalwil (CH)

(73) Assignee: 3DB ACCESS AG, Thalwil (CH)

(*) Notice: Subject to any disclaimer, the term of this patent is extended or adjusted under 35 U.S.C. 154(b) by 261 days.

(21) Appl. No.: 16/808,547

(22) Filed: Mar. 4, 2020

(65) Prior Publication Data

US 2020/0287728 A1 Sep. 10, 2020

(30) Foreign Application Priority Data

Mar. 5, 2019 (EP) ..................................... 19160837

(51) Int. Cl.
*H04L 9/40* (2022.01)
*H04L 9/32* (2006.01)
(Continued)

(52) U.S. Cl.
CPC ............ *H04L 9/3271* (2013.01); *G01S 11/02* (2013.01); *H04W 12/63* (2021.01)

(58) Field of Classification Search
CPC ... H04L 9/3271; H04L 9/0875; H04L 9/3226; H04L 63/1441; H04L 63/12;
(Continued)

(56) References Cited

U.S. PATENT DOCUMENTS

| | | | | |
|---|---|---|---|---|
| 2011/0279366 A1* | 11/2011 | Lohbihler | ............... | H01H 13/83 702/158 |
| 2016/0149550 A1* | 5/2016 | Zhu | .......................... | H04R 3/04 381/103 |
| 2016/0323246 A1* | 11/2016 | Zivkovic | ............... | H04W 12/06 |

FOREIGN PATENT DOCUMENTS

WO  WO-2017/121452 A1  7/2017

OTHER PUBLICATIONS

M. Poturalski, "Secure Neighbor Discovery and Ranging in Wireless Networks", (Jan. 1, 2011), URL: https://infoscience.epfl.ch/record/166938/files/EPFL_THS131.pdf, (Aug. 24, 2017), XP055401043 [X] 1-5,7-9,13-15 sections III-V and VII [I] 6-8,10-12, Thesis No. 5131, 2 011; 151 pgs.

(Continued)

*Primary Examiner* — Thaddeus J Plecha
(74) *Attorney, Agent, or Firm* — Blank Rome LLP (57) ABSTRACT

Device for secure distance measurement being a prover (P) or a verifier (V) comprising: a receiver (R3) configured to receive a receiving signal (RS) with a transmitted message (M) encoded therein, wherein the transmitted message (M) contains a verifying bit sequence (VBS), wherein a bit of the transmission message (M) is transmitted in the transmission signal (TS) by a pulse with a pulse modulation parameter with two pulse states, and a decoder (R2) configured to decode the verifying bit sequence (VBS) from the transmitted message (M) encoded in the receiving signal (RS). The decoder (R2) is based on a transmission format of the transmitted message (M) and based on the transmitted message (M) detected in the receiving signal (RS) defines sub-periods (4) in the receiving signal (RS) in which the first path (F1, F2) of the pulses (S1, S2) of the bits of the verifying bit sequence (VBS) of the transmitted message (M) are expected in the receiving signal (RS); and the decoder (R2) decodes a pulse state of a pulse (S1, S2) of a bit of the verifying bit sequence (VBS) based on the receiving signal (RS) received during one of the defined sub-periods (4) belonging to the pulse (S1, S2) to be decoded.

12 Claims, 4 Drawing Sheets

(51) Int. Cl.
*G01S 11/02* (2010.01)
*H04W 12/63* (2021.01)

(58) Field of Classification Search
CPC .. H04L 2209/84; G01S 11/02; H04W 12/122; H04W 12/63
See application file for complete search history.

(56) References Cited

OTHER PUBLICATIONS

M. Poturalski, et al., "Distance Bounding with IEEE 802.15.4a: Attacks & Countermeasures", IEEE Transactions on Wireless Communications, vol. 10, No. 4, Apr. 2011, pp. 1334-1344.

\* cited by examiner

METHOD, DEVICE AND SYSTEM FOR SECURE DISTANCE MEASUREMENT

RELATED APPLICATION

This application claims the benefit of European Application No. EP19160837.1, filed Mar. 5, 2019. The entire contents of that application is hereby incorporated by reference.

FIELD OF THE INVENTION

The present invention concerns a method, device and system for secure distance measurement.

DESCRIPTION OF RELATED ART

Figure 1:
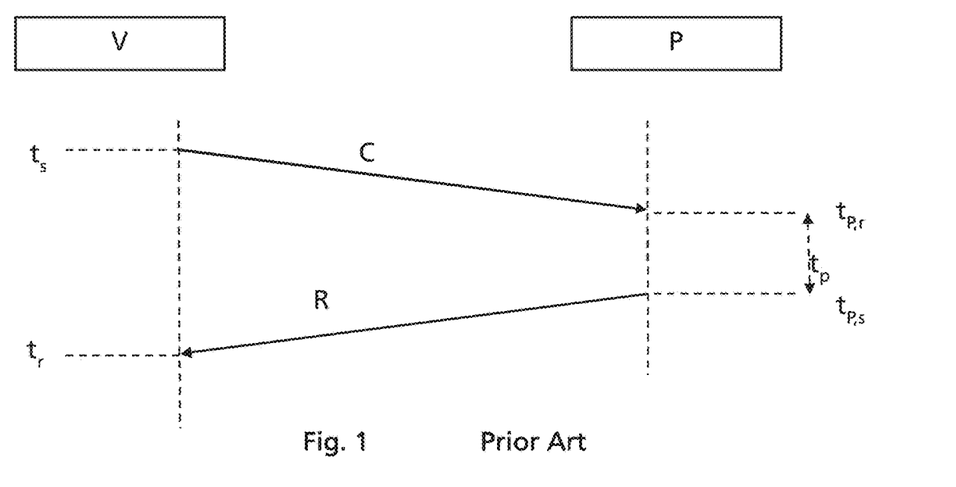
FIG. 1 shows a view of a system for secure distance measurement.

In many fields of technology, secure distance measurement becomes an important way for authenticating somebody or for allowing something based on physical proximity proof. The logical model of such a distance measurement is shown in FIG. 1. In general, a verifier V sends a challenge message with a challenge bit sequence C to a prover P. The verifier V and the prover P have a key which is used to verify the response message with the response bit sequence R. The prover P sends the response message created in the prover P based on the key and the challenge bit sequence C back to the verifier V which can then verify the authenticity by checking first the correctness of the response bit sequence R on the basis of the key and by checking second the distance of the prover P to the verifier V on the basis of the time difference between the time $t_s$ of sending the challenge C and the time $t_r$ of receiving the response message R. Such systems are known for electronic payment between a payment terminal V and payment means P like a chip card, a mobile telephone, etc. or for electronically unlocking and/or starting a car V, when the key fob P approaches the car or is in the car.

The challenge message and the response message contain bit sequences which are transmitted by a sequence of pulses, wherein each pulse contains a bit. For practical reasons to ease implementation and receiver performance (sensitivity, tolerance to varying parameters), the time of arrival of each bit is rather a time period than a point in time. This time period of the received pulse can be due to the multipath transmission of the transmitted pulse leading depending on the channel impulse response (CIR) of the current situation to a delay spread of for example 20 nanoseconds (ns) to 150 ns. This time period can be also due to a redundancy introduced to correct error messages, for example when you combine a position modulation with another modulation like phase modulation (e.g. Pulse position phase shift keying). In this case, the pulse is sent at a first position and first phase, for a first bit and at a second position with a second phase such that the transmitted bit can be demodulated based on the position and on the phase of the pulse. Thus, the received pulse is not received at one time, but at two times (or the corresponding time period between the two positions). Another example for a redundancy of the pulse which extends the time period of receiving the pulse are spread codes.

This time period of the received pulse can be used by a malicious third party for an early detect late commit attack. In this attack, an attacker transmits the challenge C to the prover P (if not already received from the verifier V directly), intercepts the start of each bit of the response from the prover P and sends the end of each bit of the response anticipated by a certain time back to the verifier V. For each logical bit transmitted (here 0 and 1), the attacker detects within a first portion of each time period the transmitted bit and anticipates then the end portion of the time period of the pulse by sending out in advance the end portion of the time period of the pulse. The attacker can thus anticipate the arrival of the pulse at the verifier. The longer the mentioned time period of the pulse is, the more the attacker can anticipate the arrival of the pulse. Anticipating the arrival of the pulse by 30 ns means that the measured distance between verifier P and prover P is maliciously shortened by 10 meters (m). This attack model can thus shorten the distance even on encrypted bit sequences, because they are encrypted only on the logical bit level and the attacker can intercept and retransmit bit by bit each bit of the transmitted bit sequence.

WO2017/121452 discloses a special solution to this problem which however applies just for spread codes and cannot be used for the other cases.

A further problem of the state of the art of secure distance measurement is that the distance between two pulses must be longer than the channel delay spread caused by the CIR to avoid an inter symbol interference (ISI) or inter pulse interference. In the field of radio data transmission, this problem is solved by an equalizer which removes the inter symbol interference based on the knowledge of the CIR. Similar as described above, the equalizer uses also the paths arriving later for decoding the relevant bit and could misused for an early detect late commit attack. Therefore, an equalizer is not suitable for the use in secure distance measurements. This is the reason that the pulses in secure distance measurement are sent with a distance which excludes inter symbol interference. This however has the disadvantage of longer verification times for verifying the prover P in the verifier V.

BRIEF SUMMARY OF THE INVENTION

The object is to overcome the problems of the state of the art of secure distance measurement, in particular to provide a fast, secure and/or reliable distance measurement.

The object is solved by the method, device and system for secure distance measurement according to the independent claims.

By defining sub-periods for the first path of the pulses to be detected and decoding the pulse values based on the defined sub-periods, an attacker cannot anymore perform an early detect and late commit attack such that manipulations of the time of flight are no longer possible.

The object is further solved by a method and a system for secure distance measurement, wherein a transmitted message containing a verifying bit sequence is transmitted from a transmitting device to a receiving device, wherein the transmitted message is encoded on a transmission signal and transmitted by the transmitting device, wherein a bit of the transmission message is transmitted in the transmission signal by a pulse with a pulse modulation parameter with two pulse states, wherein the receiving device receives a receiving signal containing the encoded transmitted message, wherein the receiving device detects the transmitted message in the receiving signal and decodes the verifying bit sequence from the receiving signal, wherein the system or method comprises the features of one or more of the following embodiments. A pulse modulation parameter with two pulse states shall comprise the case with exact two pulse states and with more than two pulse states.

The object is further solved by a receiving device or a transmitting device of this system for secure distance measurement.

In one embodiment, the method or system comprises the following steps: transmitting from a verifier to a prover a challenge message comprising a challenge bit sequence; transmitting from the prover to the verifier a response message comprising a response bit sequence; verifying, in the verifier, the response message on the basis of the response bit sequence; and determining, in the verifier, the distance between the verifier and the prover on the basis of the time difference between the challenge message and the response message.

In one embodiment, the receiving device based on the transmission format of the transmitted message and based on the detected transmitted message in the receiving signal defines sub-periods in the receiving signal in which the first path of the pulses of the bits of the verifying bit sequence of the transmitted message are expected in the receiving signal; and the receiving device decodes a pulse state of a pulse of a bit of the verifying bit sequence based on the receiving signal received during one of the defined sub-periods belonging to the pulse to be decoded. By defining sub-periods for the first path of the pulses to be detected and decoding the pulse values based on the defined sub-periods, an attacker cannot anymore perform an early detect and late commit attack such that manipulations of the time of flight are no longer possible.

In one embodiment, the receiving device decodes the pulse state of the pulse to be decoded by giving the receiving signal received during the defined sub-period of the pulse to be decoded more weight than the receiving signal after the defined sub-period of the pulse to be decoded. In one embodiment, the receiving device decodes the pulse state of the pulse to be decoded by giving the receiving signal after the defined sub-period of the pulse to be decoded a weight of zero or the receiving device decodes the pulse state of the pulse to be decoded without considering the receiving signal after the defined sub-period of the pulse to be decoded.

In one embodiment, the transmitted message contains a control bit sequence, wherein the receiving device determines a channel impulse response based on the control bit sequence of the transmitted message received with the receiving signal.

In one embodiment, a channel impulse response sub-period in which the first path of the channel impulse response is received is defined based on the determined channel impulse response, wherein the receiving device based on the transmission format of the transmitted message, based on the detected transmitted message in the receiving signal and based on the channel impulse response sub-period defines sub-periods in the receiving signal in which the first path of the pulses of the bits of the verifying bit sequence of the transmitted message are expected in the receiving signal. Based on the channel impulse response determined, the optimal channel impulse response sub-period for the detection of the first path of the pulse can be defined. Based on the channel impulse response sub-period, the optimal sub-period of the pulses of the verifying bit sequence is defined.

In one embodiment, the receiving device decodes the pulse state of the pulse to be decoded based on the receiving signal belonging to the pulse to be decoded and based on a correction of the inter pulse interference, wherein the correction of the inter pulse interference is determined on the basis of the channel impulse response determined. This allows shorter inter pulse distances, because the inter pulse interference is corrected. This significantly increases the speed of the verification of the verification bit sequence.

In one embodiment, the receiving device decodes the pulse state of the pulse to be decoded based on the receiving signal received during the defined sub-period belonging to the pulse to be decoded and based on a correction of the inter pulse interference, wherein the correction of the inter pulse interference is determined on the basis of the channel impulse response determined. This allows shorter inter pulse distances and guarantees that the correction mechanism is not misused for manipulation of the time of flight.

In one embodiment, the correction of the inter pulse interference is determined on the basis of an influence of a channel impulse response of at least one previous pulse in the defined sub-period belonging to the pulse to be decoded.

In one embodiment, the receiving device decodes the pulse state of the pulse to be decoded based on a corrected receiving signal during the defined sub-period, wherein corrected receiving signal during the defined sub-period is the receiving signal received during the defined sub-period belonging to the pulse to be decoded corrected by the correction of the inter pulse interference.

In one embodiment, the transmitted message is encoded by a combined position modulation in which a bit is encoded by a symbol comprising a pulse either at a first position of the symbol or at a second position of the symbol, wherein the pulse of the symbol has two pulse states, wherein the two pulse states are of another pulse modulation parameter (than the position). The two pulse states of the other pulse modulation parameter (e.g. phase) shall not only include the case of exact two pulse states (e.g. Binary Phase Shift Keying (BPSK)), but also include the case of more than two pulse states (e.g. for M-ary PSK)

In one embodiment, the transmitting device encodes a bit in the symbol of the combined pulse modulation such that the bit value of the symbol depends on the position of pulse of another, preferably subsequent symbol and/or of the pulse state of another, preferably subsequent symbol. This embodiment has the advantage that the combined pulse modulation cannot be misused for an early detect late commit attack.

In one embodiment, the transmitting device encodes a bit in the symbol of the combined pulse modulation such that the bit value of the symbol depends on the position of a pulse of a first symbol and the pulse state of a pulse of distinct second symbol. One of the first and second symbol can be the symbol to be encoded. This embodiment has the advantage that the combined pulse modulation cannot be misused for an early detect late commit attack.

In one embodiment, the receiving device decodes a bit in the symbol of the combined pulse modulation such that the bit value of the symbol depends on the position of pulse of another, preferably subsequent symbol and/or of the pulse state of another, preferably subsequent symbol. This embodiment has the advantage that the combined pulse modulation cannot be misused for an early detect late commit attack.

In one embodiment, the receiving device decodes a bit in the symbol of the combined pulse modulation such that the bit value of the symbol depends on the position of a pulse of a first symbol and the pulse state of a pulse of distinct second symbol. One of the first and second symbol can be the symbol to be encoded. This embodiment has the advantage that the combined pulse modulation cannot be misused for an early detect late commit attack.

In one embodiment, for a symbol representing the bits of the verifying bit sequence, the receiving device defines a first sub-period in which the first path of the pulse is expected in the receiving signal, if transmitted at the first position of the symbol to be decoded, and a second sub-period in which the first path of the pulse is expected in the receiving signal, if transmitted at the first position of the symbol) to be decoded, wherein the receiving device decodes the symbol by detecting the pulse of the symbol either in the first sub-period or in second sub-period and/or by decoding the pulse state of the pulse the symbol to be decoded based on the pulse state of the other pulse modulation parameter in the sub-period in which the pulse is detected. The combination of this embodiment with the encoding/decoding based on other symbols gives the highest security against early detect late commit attacks as the attacker can neither misuse the modulation scheme nor the delay spread of the transmission channel.

In one embodiment, the verifier verifies the challenge bit sequence as the verifying bit sequence based on an error rate which is allowed for a positive verification result. The use of only the sub-period for the first path and/or the reduction of the inter pulse distance might decrease(s) a little bit the reliability of the detection of the correct pulse state. By allowing some bits of the challenge bit sequence (up to the allowed error rate) to be wrong, this decrease in reliability can be compensated. By increasing the length of the challenge bit sequence, this might not even influence the security level.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The system and method for secure distance measurements according to the invention is based on the secure distance measurement between a verifier V and prover P as described in FIG. 1.

The verifier V transmits a challenge message to the prover P. The challenge message contains a challenge bit sequence C. The challenge bit sequence C is a sequence of logical bits which is normally randomly generated in the verifier V. The prover P receives the challenge message with the challenge bit sequence C. When the prover P has received the challenge message, it creates a response bit sequence R and transmits a response message with the response bit sequence R back to the verifier V. The verifier V receives the response message with the response bit sequence R, verifies the authenticity of prover P on the basis of the response bit sequence R and a cryptographic key and checks the distance to the prover P on the basis of the time of flight.

For the verification, the prover P and the verifier share a cryptographic key. The cryptographic key may be a common symmetric key in the prover P and the verifier V. Alternatively, the cryptographic key might comprise two key pairs, wherein each of the prover P and the verifier V has its own private key and the public key of the respective other.

The number of verification methods is manifold, and the method to create the response message and verifying the response message in the verifier V change according to the used verification method. The invention is not restricted to one verification method.

In one exemplary verification method, the prover P creates the response bit sequence R on the basis of the received challenge bit sequence C and the cryptographic key. This may be achieved by encrypting the challenge bit sequence C by the cryptographic key or by computing a cryptographic hash function of the challenge bit sequence C and a prover generated bit sequence using the cryptographic key. Many other functions depending on the challenge bit sequence C and the cryptographic key are possible. The verifier V can then verify the prover P on the basis of the response bit sequence R, the challenge bit sequence C and the cryptographic key, for example by determining the response bit sequence R from the transmitted challenge bit sequence C and the cryptographic key in the same way as in the prover P and comparing the determined response bit sequence R with the received response bit sequence R.

In another exemplary verification embodiment, the response bit sequence R is independent of the cryptographic key. For example, the response bit sequence R could be a random bit sequence created in the prover P or some fast function of itself and the challenge bit sequence C. This has the advantage that the time of processing $t_p$ in the prover P can be reduced. In this case, a verification message is sent after the response message from prover P to the verifier V containing a further response bit sequence depending on the challenge bit sequence C, the response bit sequence R and the cryptographic key. The verifier V can then verify the authenticity of the received response message including the response bit sequence R on the basis of the challenge bit sequence C, the further response bit sequence and the cryptographic key.

The performed check of the distance between the verifier V and the prover P is based on the challenge message and the response message. The distance is determined or estimated on the basis of the time of flight of the challenge message and the response message. Since the time of flight and the distance are directly proportional to each other via the constant medium's velocity of the challenge and the response message, the determination of the time of flight of the challenge and response message corresponds to the determination of the distance between verifier V and the prover P and is not distinguished in this invention. The terms time difference and distance and the terms time and position are thus used interchangeably in the following. The methods to determine the time of flight is manifold and shall not restrict the invention. In one embodiment, the time of flight is based on the time difference $t_e-t_s$ between the transmission of the challenge message and the reception of the response message at the verifier V. In order to check the distance or time of flight, the determined time of flight or distance is compared with a threshold. If the time of flight or distance is smaller than a certain threshold, the authorisation for a certain action, like opening the door of a car, starting the engine, etc., is given, if the verification described before is also positive. Preferably, the time difference $t_e-t_s$ or the threshold is corrected by the processing time $t_p$ at the prover P so that the time difference $t_e-t_s$ is reduced or the threshold is increased by the processing time $t_p$. The processing time $t_p$ is preferably fixed and can be corrected for each distance measurement in the same (hard coded) way. However, it would also be possible to transmit the processing time $t_p$ or the sending time the sending time $t_{P,s}$ of the response message and the receiving time $t_{P,r}$ of the challenge message with the response message or another message. As already mentioned, the invention is not restricted to any of those methods for checking the distance or the time of flight.

Figure 2:
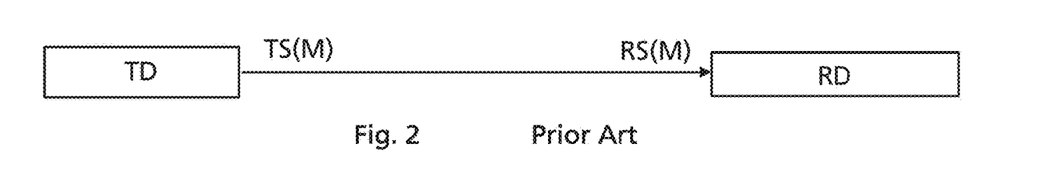
FIG. 2 shows a transmission of a transmitting message from a transmitting device to the receiving device.

For the sake of brevity and to avoid the description of the invention twice, the terms transmitting device TD and receiving device RD replace in the following description the terms prover P and verifier V in there functions as transmitting device TD or receiving device RD and the term transmitted message M replaces the challenge message or the response message. The transmitted message M is either the challenge message transmitted from the verifier V as the transmitting device TD to the prover P as the receiving device RD or the transmitted message M is the response message transmitted from the prover P as the transmitting device TD to the verifier V as the receiving device RD. The transmitted message M contains a verifying bit sequence VBS. If the transmitted message M is the challenge message, the verifying bit sequence VBS is the challenge bit sequence C. If the transmitted message M is the response message, the verifying bit sequence VBS is the response bit sequence C. FIG. 2 shows the process of sending or transmitting from the transmitting device TD the transmitted message M to the receiving device RD. The transmitted message M is encoded or modulated on a transmission signal TS which is sent out from the transmitting device TD. The receiving device RD receives a receiving signal RS including the encoded transmitted message M. The receiving signal RS corresponds to the transmission signal TS as received by the receiving device RD, i.e. the transmission signal TS influenced by the transmission channel, e.g. with the transmission errors and/or multipath influences (echoes). In other words, the receiving signal RS is the channel impulse response of the transmission signal TS.

Figure 3:
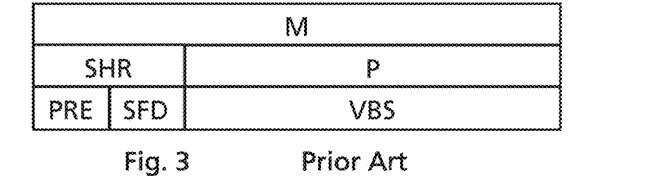
FIG. 3 shows an embodiment of the logical transmission format of the transmitted message.
Figure 4:
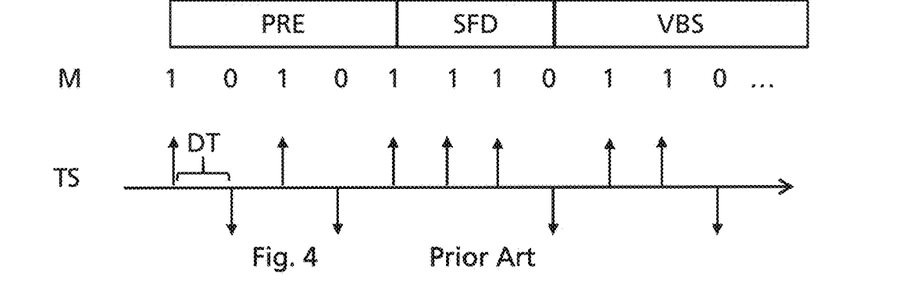
FIG. 4 shows an embodiment of the logical and physical transmission format of the transmitted message.

An exemplary embodiment of the logical transmission format of the transmitted message M is shown in more detail in FIG. 3. The transmitted message M is sometimes also called transmitted or transmission package. The transmitted message M comprises preferably a header section, a data section P and an end section (not shown). In one embodiment, the transmitted message M, preferably the header section comprises a synchronization header (SHR). The transmitted message M, the header section and/or the SHR comprises in one embodiment the preamble PRE and/or the start of frame delimiter SFD. The preamble PRE is preferable a periodic bit sequence, e.g. a bit sequence changing each subsequent bit between 1 and 0, and/or is a bit sequence which remains the same for each transmitted message M sent out. The start of frame delimiter SFD is preferable is a bit sequence which remains the same for each transmitted message M sent out, e.g. a bit sequence of bits with the same value. Preferably, the SHR, the PRE and/or the SFD is used to identify a transmitted message M in the receiving signal RS received in the receiving device RD and/or for synchronization of the receiving device RD to the received transmitted message M in the receiving signal RS. The header section can comprise further information. FIG. 4 shows an example of the bit sequence of the transmitted message M. Here the preamble PRE is 1010 and the start of frame delimiter SFD is 111. The transmitted message M, the header section or the data section P can comprise further an identifier bit sequence of the transmitting device TD and/or of the receiving device RD. This could be for example a MAC address and/or a Service Set Identifier (SSID). The identifier(s) is/are preferably 32 bit or longer. The identifier bit sequence is preferably arranged before the verifying bit sequence VBS. The data section P is also called payload or PHY payload. The payload P comprises the data to be transmitted, here in particular the verifying bit sequence VBS. The data section P can comprise further information. The payload P in FIG. 4 starts here with 0110. Obviously, this is just an example. The end section is preferable a bit sequence which remains the same for each transmitted message M sent out. Preferably, the end section comprises for example a postamble configured to detect at the receiver an end of the received message. The end section is arranged after the verifying bit sequence VBS. However, the described format is optional. For example, the end of the message could also be determined by having a known length so that the end section can be omitted. The header section and/or the end section or parts thereof could be only present in the physical layer (PHYS) of the OSI reference model and not in the logical layer or data link layer, for example the SHR and/or the postamble. This means that the parts being only present in the physical layer do not correspond to a bit sequence in the logical layer. Preferably, the SHR, the preamble PRE, the SFD and/or the postamble is/are a predetermined sequence of bits which are equal for each transmitted message M sent out from the transmitting device TD. The described logical transmission format of the transmitted message M is just an example and does not limit the invention. Any other logical transmission format is possible.

The transmitted message M is physically modulated or encoded on the transmission signal TS which is transmitted from the transmitting device TD to the receiving device RD. The format of the encoding or modulation is subsequently called the (physical) transmission format.

The transmitted message M is preferably transmitted by a carrier wave. The carrier wave is preferably an electromagnetic wave, but could also be a sound wave. The carrier wave or electromagnetic wave is preferably a radio wave, but could also be a light wave or other wave. For simplicity, the radio wave should also include microwaves so that the radio wave spectrum can go up to 100 Gigahertz (GHz). Preferably, the carrier wave or the radio wave is higher than 100 Megahertz (MHz), preferably higher than 500 MHz, preferably higher than 1 GHz, preferably higher than 3 GHz. Preferably, the carrier wave or the radio wave is lower than 200 GHz, preferably lower than 100 GHz, preferably lower than 50 GHz, preferably lower than 30 GHz, preferably lower than 20 GHz, preferably lower than 15 GHz, preferably lower than 10 GHz. Preferably, wide band pulses with a frequency bandwidth of at least 50 MHz are used to transmit the symbols. Even more preferably, an ultra wide band (UWB) pulse is used with a frequency bandwidth of at least 500 MHz. The high bandwidth shortens the time of the pulse which first reduces the estimation error of the time of arrival and the time of departure of a pulse and second reduces the possibility of any physical attack on the pulse level. For example a pulse rate of 4 GHz or higher and a pulse bandwidth of 500 MHz or higher could be used.

Preferably, the transmitted message M is transferred by a sequence of physical symbols corresponding to the sequence of logical bits of the transmitted message M. Preferably, each symbol corresponds to one bit (binary modulation, in particular binary shift keying). However, it would also be possible that more than one bit corresponds to one symbol. Preferably, each symbol is transferred with (at least) one pulse such that the transmitted message M is transferred by a sequence of pulsed physical symbols corresponding to the sequence of logical bits of the transmitted message M. The symbol can have two symbol states representing the two logical bit values 0 and 1. FIG. 4 shows a transmission signal TS with the symbol sequence corresponding to the bit sequence of the transmitted message M modulated on the transmission signal TS. Preferably, the symbols of the transmitted message M are transmitted equidistantly, i.e. the distance or time period DT between two subsequent symbols of the transmitted message M remains constant over the message M. The symbol states are transmitted in the transmission signal TS with two distinct states of the pulse modulation parameter (in FIG. 4 represented by two arrows, one "up" and another "down"). A pulse modulation parameter with two pulse states shall comprise the case with two pulse states, but also with more than two pulse states. The pulse modulation parameter can be amplitude (amplitude modulation (AM) or amplitude shift keying (ASK)), phase (phase modulation (PM) or phase shift keying (PSK)), frequency (frequency modulation (FM) or frequency shift keying (FSK)), position (pulse position modulation (PPM)) or any other electrical parameters of the carrier wave between two states of the pulse modulation parameter. The two states of the pulse modulation parameter of the symbol are shown for simplicity by an arrow pointing up and down.

Figure 5:
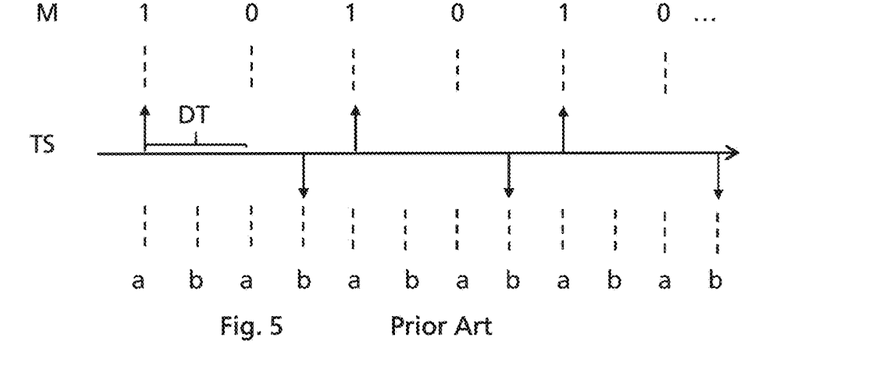
FIG. 5 shows an embodiment of the physical transmission format of the transmitted message with a combined position modulation.

In one embodiment, the symbol can have also more than two symbol states, e.g. four symbol states, to increase the number of bit(s) transmitted per symbol (like in QAM) or to perform error correction by a redundancy. The higher number of symbol values can for example be transmitted by two or more pulses each having two possible states of a pulse modulation parameter. One example is for example in spread codes wherein different chips are each transferred via one pulse with two possible states and form all together one symbol (representing one bit). Another example for a symbol (representing one bit and) having more than two symbol states can be done by combining pulse position modulation (PPM) with another (distinct) pulse modulation parameter like phase, frequency, polarity, amplitude, etc (shortly in the following combine pulse modulation). The symbol of the combined pulse modulation defines two positions a and b at which a pulse can be transmitted. Each pulse can have two states of the other pulse modulation parameter. FIG. 5 shows an example of such a combined pulse modulation, wherein the two positions in the symbol are referenced by a and b and the two states of the other pulse modulation parameter is shown by an arrow up and down. The first bit value (in FIG. 5 "1") is transmitted by a pulse at the first position a with a first state of the other pulse modulation parameter (in FIG. 5 "up"). The second bit value (in FIG. 5 "0") is transmitted by a pulse at the second position b with a second state of the other pulse modulation parameter (in FIG. 5 "down"). This allows to detect the modulated bit not only by the position, but also by the other pulse modulation parameter and allows thus better to demodulate the transmitted bit in noisy environments. Preferably, the pulses of each symbol are transmitted equidistantly, for example at 0 and DT/2. However, it is also possible that the distance between two subsequent positions a and b of the same symbol have a different length than the distance between the last positions b(n) of the symbol n and the first position a (n+1) of the subsequent symbol n+1.

Figure 6:
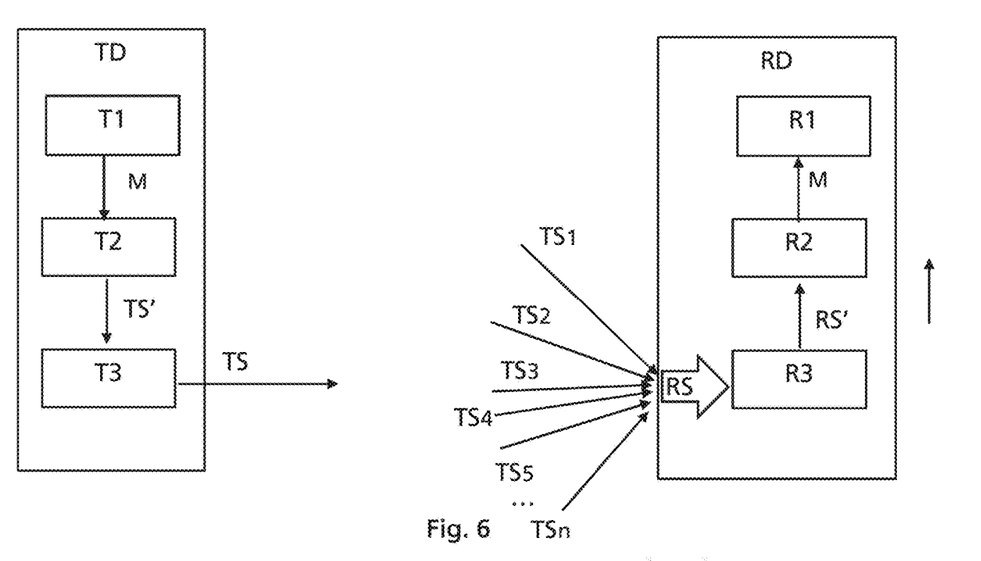
FIG. 6 shows the system with the transmitting device and the receiving device.

The invention is described in more detail in FIG. 6.

The transmitted message M comprises a control bit sequence and the verifying bit sequence VBS. The control bit sequence is a sequence of bits known in the receiving device RD. The control bit sequence is preferably the header section or a part of it. The control bit sequence can however also be a part of the payload P or any other part of the transmitted message M (distinct from the VBS). Preferably, the control bit sequence is transferred before the VBS. Preferably, the control bit sequence is the SHR, the Preamble PRE or the start of frame delimiter SFD or a part of it.

The transmitting device TD comprises a function section T1, an encoder T2 and a transmitter T3.

The function section T1 prepares the verifying bit sequence VBF to be sent to the receiving device RD. Preferably, the function section T1 prepares the logical bit sequence of the payload P, preferably of the complete message M. The function section T1 shall represent all further functions described above of the verifier V or the prover P whichever of the two acts in this moment as the transmitting device TD. If the transmitting device TD is the prover P, the function section T1 shall represent here the functions of the prover P for receiving the challenge message and preparing the response message as the transmitted message M. If the transmitting device TD is the verifier V, the function section T1 shall represent here the functions of the verifier V, in particular for preparing the challenge message as the transmitted message M (and for receiving and processing the response message).

The encoder T2 encodes the transmitted message M in a physical signal, i.e. the encoder T2 modulates the transmitted message M on the physical signal. The physical signal TS' can be at the transmission frequency of the carrier wave. However, often the physical signal is a wave at an intermediate frequency or at a base frequency. The encoding process was described above and is well-known state of the art. Just one embodiment of the encoder T2 which will be described later in the context of FIGS. 10 and 11 distinguishes from the existing encoders.

The transmitter T3 transmits wirelessly the transmission signal TS with the transmitted message M encoded to the receiving device RD. Therefor, the transmitter T3 emits the transmission signal TS prepared in the encoder T2. For a radio wave, this might be done via an antenna. The transmitter T3 might perform some pre-processing. This might include to mix the physical signal to the transmission frequency to obtain the transmission signal TS.

The transmission signal TS "travels" through the transmission channel and arrives at the receiving device RD as the receiving signal RS. The transmission channel often comprises a multichannel effect, i.e. a superposition of several transmission paths of the transmission signal TS with different phases. The delay between the first transmission path and the last (significant or measurable) transmission path is called the delay spread of the transmission channel. This delay spread is usually between 20 ns and 150 ns. The delay spread corresponds to the length of the channel impulse response (CIR) of the transmission channel. However, the transmission channel can have other, additional or no disturbances of the transmission signal TS.

In the following, a first main embodiment and a second main embodiment of the invention shall be distinguished. In the first embodiment, the inter symbol distance or the inter pulse distance DT in the transmission signal TS is larger than the usual delay spread of the transmission channel. Thus, in the first embodiment, an inter symbol interference is not expected. Preferably, the inter symbol distance or the inter pulse distance DT in the transmission signal TS is larger than 50 ns, preferably than 100 ns, preferably than 150 ns, preferably than 200 ns, preferably than 300 ns. If the symbol has one pulse, the inter symbol distance corresponds to the inter pulse distance.

In the second embodiment, the inter symbol distance or the inter pulse distance DT in the transmission signal TS is smaller than the usual delay spread of the transmission channel. Thus, in the second embodiment, an inter symbol interference is expected. This has the advantage that the transmitted message M can be transmitted much faster. However, the solutions of the state of the art do not provide a reliable and secure distance measurement solution for such short inter pulse/symbol distances. Preferably, the inter pulse distance or the inter symbol distance in the transmission signal TS is smaller than 150 ns, preferably than 100 ns, preferably than 70 ns, preferably than 50 ns, preferably 40 ns.

Figure 7:
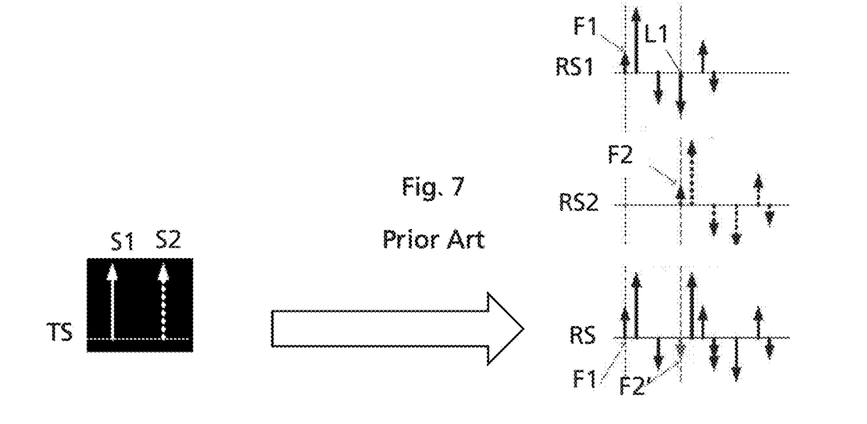
FIG. 7 shows an inter symbol interference in the receiving signal of two symbols.

FIG. 7 shows the effect of inter pulse interference caused by small inter pulse distances in the second main embodiment. This is shown on the basis of the transmission signal TS with two pulses or symbols S1 and S2. The receiving signal RS is the superposition of the channel impulse response RS1 of the first symbol or pulse S1 received at the receiving device RD and of the channel impulse response RS2 of the second symbol or pulse S2 received at the receiving device RD. The first path F1 of the first pulse or symbol S1 is still received well in the receiving device RD, because it is not disturbed by the late paths of any previous symbols or pulses. The first path F2 of the second pulse or symbol S2 is however disturbed by a late path L1 of the first pulse or symbol S1 leading to a disturbed first path F2' of the second pulse or symbol S2 in the receiving signal RS. This makes it nearly impossible to detect the first path F2 of the pulses or symbols S2 disturbed the late pulses of earlier pulses or symbols S1. Therefore, short inter pulse distances are not used in secure distance measurement of the state of the art.

The receiving device RD comprises a function section R1, a decoder R2 and a receiver R3.

The receiver R3 receives the (wireless) receiving signal RS and forwards the receiving signal RS' to the decoder R2. Preferably, the receiver R3 processes the receiving signal RS before it is forwarded to the decoder R2. In one embodiment, the receiving signal is down mixed to an intermediate or base frequency. In one embodiment, the receiving signal RS (preferably after downmixing) is digitalised by an analogue-to-digital converter (A/D converter). If the transmitting signal TS and the receiving signal RS is transmitted by a radio wave, the receiver R3 comprises preferably an antenna for receiving the receiving signal RS.

The decoder R2 receives the receiving signal RS. The decoder R2 processes the receiving signal RS'.

The decoder R2 detects the reception of a transmitted message M encoded on the receiving signal RS. This detection can be performed based on the header section, control bit sequence or SHR known by the receiving device RD. This is well known state of the art. Once the decoder R2 detects a transmitted message M, it continues with the subsequent processing.

Preferably, the decoder R2 determines the header section, the SHR, the preamble PRE, the SFD and/or the control bit sequence in the receiving signal RS. These sections are used for example for the usual message processing, like synchronization etc.

Preferably, the decoder R2 determines a channel impulse response (CIR) of the transmission channel of the transmission signal TS of the transmitted message M. The CIR corresponds to the receiving signal RS of a pulse (of the modulation scheme or physical transmission format used in the transmission signal TS for the transmitted message M) transmitted from the transmitting devise TD. The CIR can be estimated based on the control bit sequence in the receiving signal RS (determined before) and the theoretical knowledge of the control bit sequence in the transmission signal TS. Preferably, the CIR is estimated based on a plurality of bits of the control bit sequence. However, the CIR can also be estimated based on only one bit of the control bit sequence. In particular in the second main embodiment, the CIR is estimated preferably based on multiple bits of the control bit sequence. Preferably, the control bit sequence comprises a CIR control bit sequence which is used for estimating the CIR.

Figure 8:
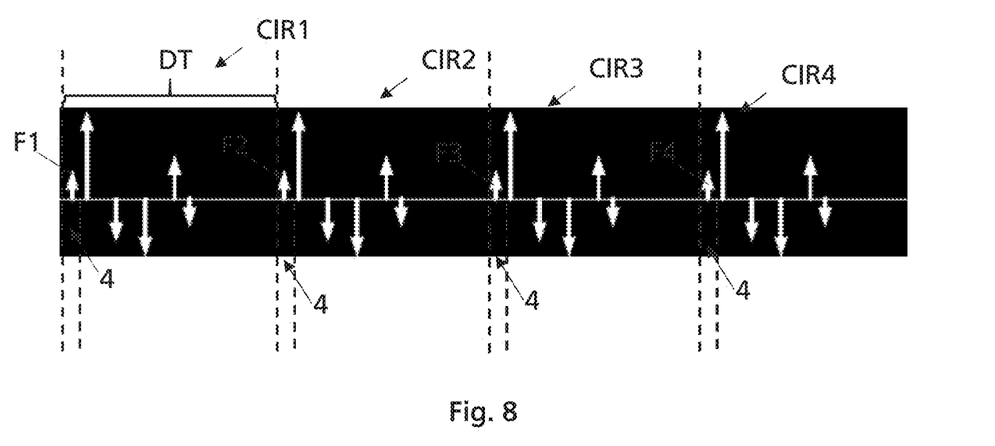
FIG. 8 shows the decoding of the bits of the transmitted message from the receiving signal in a first main embodiment without inter symbol interference.

The decoder R2 determines based on the (physical) transmission format sub-periods 4 of the receiving signal RS in which the first path of the pulses of the transmitted message M or the verifying bit sequence VBS are expected or received. The first path of a pulse in the sense of the invention is referred to the component(s) or one of the components of the pulse which arrives first, i.e. which arrives via the fastest transmission path at the receiving device RD. Thus, the first path of a pulse shall not be limited to the exact first path arriving at the receiving device RD, but to one of the first paths of the pulse arriving at the receiving device RD. The The example of FIG. 8 shows a receiving signal RS with the channel impulse responses CIR1, CIR2, CIR3, CIR4 of several subsequent symbols or pulses received for the first main embodiment. The sub-periods 4 of the receiving signal RS are preferably determined based on the transmission format and the position of one or more pulse(s) of transmitted message M, the header section, the control bit sequence or the SHR of the transmitted message M detected in the receiving signal RS. For example, if the transmission format of the transmitted message M provides equidistant pulses, the detection of the sub-period 4 of the first path F1 of one single pulse or symbol of the transmitted message M allows to define the sub-period 4 of the first path F2, F3, F4 of all other pulses or symbols of the transmitted message M. The position of the one or more pulse(s) of the transmitted message M in the receiving signal RS can be for example determined based on a position control bit sequence of the control bit sequence. The position control bit sequence and the CIR control bit sequence can be the same, overlapping or completely distinct. Each, some or one of the sub-periods 4 have/has a length or width smaller than 20 ns, preferably than 15 ns, preferably than 10 ns, preferably than 8 ns, preferably than 6 ns, preferably than 5 ns, preferably than 4 ns, preferably than 3 ns. In a preferred embodiment, the length or the width of each, some or one of the sub-periods 4 is larger than the half-width of the pulse of the transmission format, preferably than twice this half-width, preferably than three times this half-width. In a preferred embodiment, the sub-period 4 in which the first path Fn of a pulse of the transmitted message M is expected or received is determined based on the CIR determined before. The CIR can be used to determine which part of the CIR shall be used as sub-period 4 for detecting the state or value of the transmitted pulse or symbol. Preferably, this is the first part of the CIR which contains the first path of the pulse received. However, it can also be advantageous to skip one or several of the first paths and define then the sub-period 4 for detecting the pulse. This can be in some environments due to the fact that the first path might be very quick, but very disturbed. Therefore, first path of the CIR in the sense of the invention shall not be limited to the exact first path arriving at the receiving device RD, but to one of the first paths of the pulse arriving at the receiving device RD. The sub-period 4 is preferably arranged in the first half of the CIR, preferably in the first 40% of the CIR, preferably in the first 30% of the CIR, preferably in the first 20% of the CIR, preferably in the first 10% of the CIR. The sub-period 4 shall also not be limited to contain only one path of the pulse, but could be so large to comprise two or more paths of the pulse.

The decoder R2 decodes the bits of the transmitting message M or the verifying bit sequence VBS based on the receiving signal RS received during the defined sub-periods 4. This has the advantage that bits of the transmitted message M, in particular of the verifying bit sequence VBS are determined on the first paths of the pulses received at the receiving device RD such that no early detect late commit attacks are possible. The decoder R2 decodes the bits of the transmitting message M or the verifying bit sequence VBS based on the receiving signal RS received during the defined sub-periods 4 such that a manipulation of the paths arriving after the sub-period 4 cannot influence the detection of the bit of the pulse or symbol, in particular cannot influence the detection of the time of arrival of the pulse or the value of the bit. In one embodiment, the receiving device RD decodes a bit of the verifying bit sequence VBS giving the receiving signal RS received during the defined sub-period 4 corresponding to this bit or pulse more weight than the receiving signal RS outside of the defined sub-period 4 (corresponding to subsequent paths of the channel impulse response of the pulse of the bit to be decoded). In the most basic example, the bit of a pulse or symbol is detected only based on the sub-period 4 defined for this pulse or symbol (weight one) without considering the receiving signal outside of the defined sub-periods 4 (weight zero). In a more sophisticated approach, the data points of the channel impulse response outside of the sub-period 4 is used for estimating the bit value of the pulse or symbol, but the data points of the data points or signal of the sub-period 4 defined for this pulse or symbol have a higher weight for estimating the bit of this pulse or symbol than the data points or signal of the channel impulse response outside of the defined sub-period 4.

Figure 9:
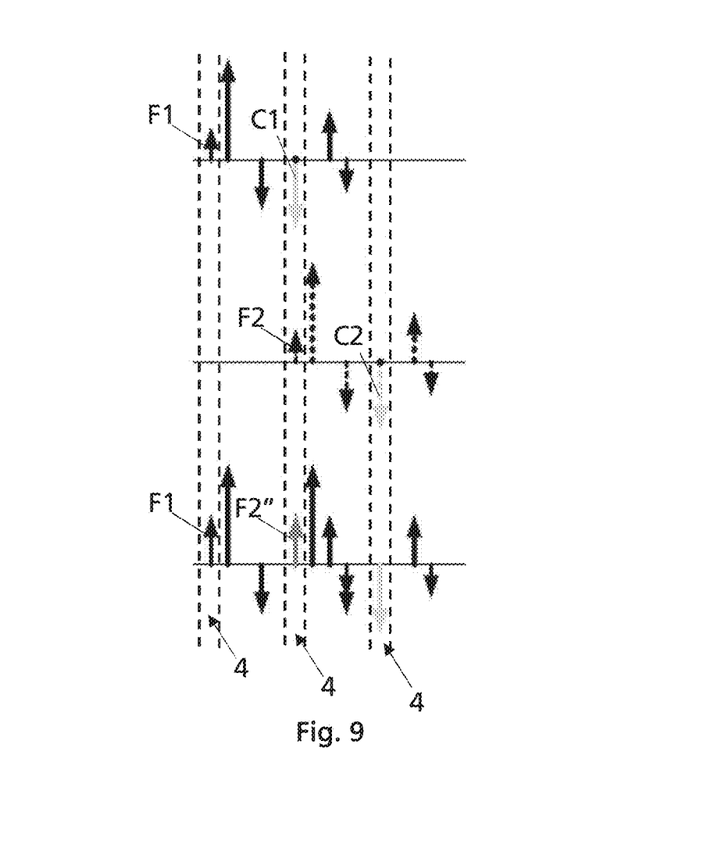
FIG. 9 shows the decoding of the bits of the transmitted message from the receiving signal in a second main embodiment with inter symbol interference.

FIG. 9 shows now the process of decoding in the case of the second main embodiment. As described before, the decoder R2 defines the sub-periods 4 in the receiving signal RS where it expects the first path F1, F2, . . . of the pulses or symbols S1, S2. Since the first path F2' in the receiving signal RS is disturbed by the channel impulse response of the previous pulses S1, the decoder R2 estimates the true first path F2" of the second pulse or symbol S2 based on the channel impulse response, in particular on the channel impulse response of at least one pulse received before the first path F2 of the pulse to be estimated. For simplicity of the description, the pulses or symbols will be numbered or indexed in the order of receiving the pulses or symbols. If the receiving device RD receives in the transmitted message hundred pulses or symbols, the first pulse or symbol received is numbered one as S1 and the last hundred as S100. In general, the index n is used to indicate a particular pulse or symbol Sn and the index n+1 is used for the pulse Sn+1 received directly after the pulse Sn and the index n−1 is used for the pulse Sn−1 received directly before the pulse Sn. For example, the channel impulse response Cn−1 (in FIG. 9 C1) or the late pulse (L1 in FIG. 7) of the previous pulse Sn−1 (here S1) received in the sub-period of the pulse Sn (here S2) is used to correct the receiving signal RS in the sub-period defined for the pulse n (here S2) so that the correct first path Fn" (F2") of the pulse or symbol Sn (S2) can be retrieved. The same can be done for L multiple pulses or symbols Sn−i with i=1, . . . , L preceding the pulse Sn so that the first path Fn of the pulse Sn is corrected in the sub-period of the pulse Sn by the channel impulse responses Cn−i of the previous pulses Sn−i received in the sub-period of the pulse n. Preferably, the decoder R2 estimates the true first path Fn" of the pulse or symbol Sn based on the value and the channel impulse response of at least one pulse Sn−i received before the first path Fn of the pulse Sn to be estimated. The value can be the bit value or also signal value of the pulse or symbol Sn−i. This process allows to shorten the inter symbol/pulse distance of the transmitted message M significantly which leads to a much shorter exchange of the challenge and response message. Nevertheless, the verifying bit sequence can reliably be detected from the receiving signal due to the described correction mechanism. The equalizers used in the state of the art for data communication with ISI (but not for secure distance measurement) would be very vulnerable for early detect late commit attacks, because they use the full CIR for detecting the bit of the pulse. The described method corresponds to a focused equalizing approach which focuses the equalizer result on the defined sub-periods and is thus not sensible to those attacks. The at least one "previous pulse" of a pulse to be decoded shall refer to a sequence of pulses of at least one pulse received in the receiving device RD (directly) before the pulse to be decoded.

The decoder R2 preferably processes the receiving signal RS digitally. The decoder R2 can thus be integrated in a chip or processor which fulfils also other functions of the function section R1. However, it is also possible that the decoder R2 is in a separate chip or processor or that the decoder R2 process the receiving signal RS fully or partly analogously.

The decoded bits of the verifying bit sequence VBS or of the transmitted message M are forwarded then to the function section R1 which continues to treat the verifying bit sequence VBS depending on the function of the receiving device RD as prover P or as verifier V. If the receiving device RD is the prover P, the function section R1 shall represent here the functions of the prover P for processing the received challenge message as the transmitted message M and for preparing and sending back the response message. If the receiving device RD is the verifier V, the function section R1 shall represent here the functions of the verifier V, in particular for verifying the response bit sequence R of the response message as the transmitted message M and for determining the time of flight of the challenge and response message.

In the case, a combined position modulation as described above in FIG. 5 is used as a transmission format for the transmitted message M, each symbol n has two potential positions a and b of the transmitted pulse. Therefore, each symbol n comprises two sub-periods 4.a and 4.b for the potential pulse positions a and b of each symbol (see FIG. 11). The decoder R2 performs the above-described detection of a pulse for each of the two sub-periods 4.a of the symbol.

If the correction of ISI of FIG. 9 is applied as well, the consideration of the value of the previous pulse n−i is very important, because only at 50% of the pulse positions a pulse is actually received.

Figure 10:
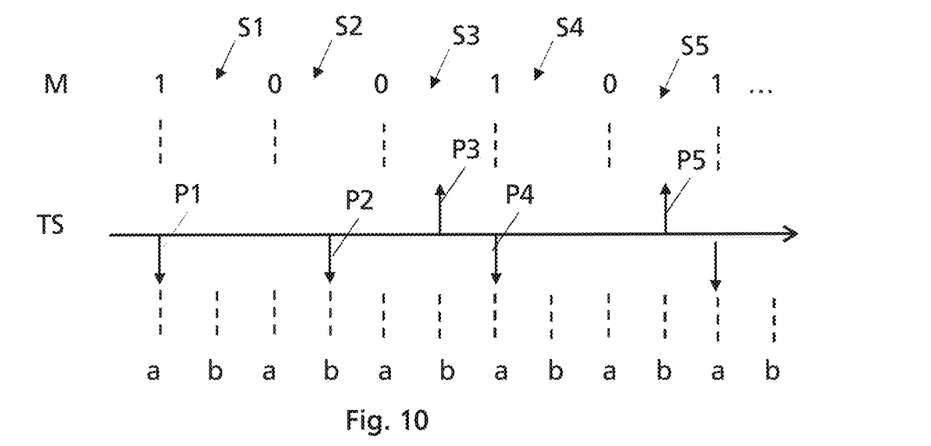
FIG. 10 shows a special encoding scheme for combined position modulation.
Figure 11:
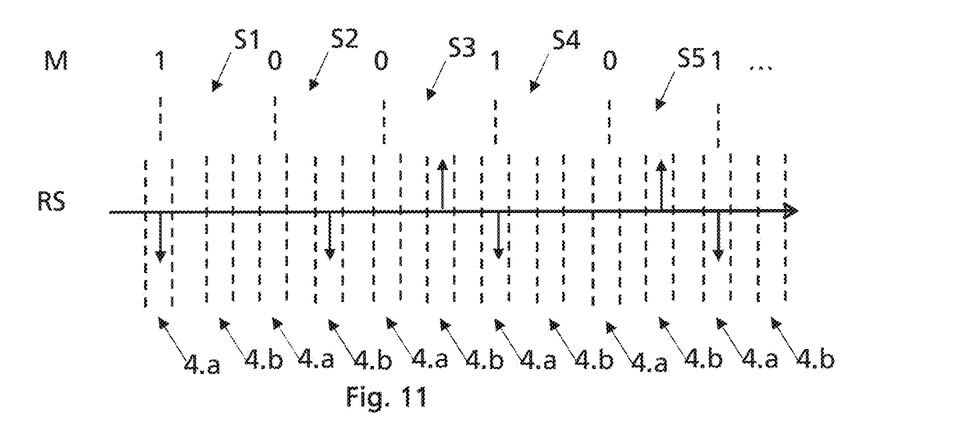
FIG. 11 shows a decoding scheme for the combined position modulation shown in FIG. 10.

In the following, one special embodiment of the invention for the use of combined position modulation shall be described. In this case, an attacker could always early detect the first position and send the second position of the same symbol earlier to manipulate the time of arrival. This attack would work for the combined position modulation also with the above described measures. FIGS. 10 and 11 show now one special embodiment of the invention which overcomes this problem related to the combined position modulation. In the combined position modulation of the state of the art, the position of the pulse and the other pulse modulation parameter of the symbol n depends both on the bit value of the same symbol n. In order to avoid the described problem, it is suggested to change the combined position modulation such that the position of the pulse and/or the other pulse modulation parameter of the symbol n depends on the bit value of another symbol n+/−I, and/or that the position of the pulse and the other pulse modulation parameter of the symbol n depend on the bit value of distinct symbols. This makes it very hard for the attacker to predict what he needs to send at the next position and makes also secure distance measurement with combined position modulation safe. Preferably, at least one of the position of the pulse and of the other pulse modulation parameter of the symbol n depends on the bit value of another subsequent symbol n+i. Since the bit value of another subsequent symbol n+i lays in the future, the attacker cannot predict the pulse of the next position b from the first position a. Therefore, an early detect and late commit attack becomes impossible. For simplicity, i is preferably chosen small, e.g. i=1. For the last bit(s) of the transmitted message M or of the verifying bit sequence VBS, there could be an exception from this rule as there might not be a subsequent symbol. This rule could be that the last symbol is encoded as in the state of the art based on the bit value of the present symbol. However, any other special rule would be possible.

Thus, in this embodiment, the transmitting device TD or the encoder T2 encodes the symbol n of the transmitted message M such in the transmission signal that at least one of the position of the pulse and of the other pulse modulation parameter of the symbol n depends on the bit value of another symbol n+/−I, preferably a subsequent symbol n+i, and/or that the position of the pulse and the other pulse modulation parameter of the symbol n depend on the bit value of distinct symbols. FIG. 10 shows such an example with the position of the symbol n depends on the bit value or state of the symbol n (a for 1 and b for 0) and the other pulse modulation parameter of the symbol n depends on the bit value or state of the subsequent symbol n+1 (down for 0 and up for 1).

The decoder R2 decodes the bit value or state of the symbol n such that the position of the pulse and/or the other pulse modulation parameter of the symbol n depends on the bit value of another symbol n+/−i, preferably a subsequent symbol n+i, and/or that the position of the pulse and the other pulse modulation parameter of the symbol n depend on the bit values of distinct symbols. If a future symbol n+i is used for the encoding of the symbol n, the decoder R2 can thus record the receiving signal RS or its sub-periods 4.a, 4.b or the pulse states detected in the sub-periods 4.a, 4.b and decode from behind the bits or symbols of the transmitted message M or of the VBS.

To further increase the reliability of this method, the verifier V could accept a certain error rate of the challenge bit sequence C. If less bits than the accepted error rate are wrong, the challenge bit sequence C is accepted and the prover is authenticated. This makes the method even more reliable without loosing too much security.

The described process of encoding the transmitted message M in the transmitting device TD and decoding the transmitted message M in the receiving device RD can be applied with either
- the verifier V being the transmitting device TD, the prover P being the receiving device RD and the transmitted message M being the challenge message, or
- the prover P being the transmitting device TD, the verifier V being the receiving device RD and the transmitted message M being the response message, or
- first, the verifier V being the transmitting device TD, the prover P being the receiving device RD and the transmitted message M being the challenge message and then second, the prover P being the transmitting device TD, the verifier V being the receiving device RD and the transmitted message M being the response message.

In the latter case, the verifier V is first the transmitting device TD for transmitting and encoding the challenge message and is then the receiving device RD for receiving and decoding the response message, and the prover P is first the receiving device RD for receiving and decoding the challenge message and then second the transmitting device TD for transmitting and encoding the response message.

In view of the described invention, the function of the verifier can be described in more detail as follows. The verifier V receives the receiving signal RS with the response message. The verifier V verifies the authenticity of prover P on the basis of the response bit sequence R and the time of flight of the challenge and response message. The verifier V verifies the authenticity of prover P on the basis of the response bit sequence R by decoding the response bit sequence R based on the sub-periods 4 of the pulses of the response bit sequence R and by verifying this response bit sequence R with the cryptographic key. Thus, due to the use of the sub-periods 4 a late commit attack cannot manipulate the bits of the response bit sequence R. The verifier V verifies or checks the distance to the prover P (to the verifier V) on the basis of the time of flight of the response message which is determined based on the time of arrival of the pulse(s) in the sub-period(s) 4 at the receiving device RD or at the verifier V.

The invention claimed is:

1. Method for secure distance measurement comprising the following steps:
   transmitting from a verifier to a prover a challenge message comprising a challenge bit sequence;
   transmitting from the prover to the verifier a response message comprising a response bit sequence;
   verifying, in the verifier, the response message on the basis of the response bit sequence; and
   determining, in the verifier, a distance between the verifier and the prover on the basis of a time difference between the challenge message and the response message;
   wherein a transmitted message containing a verifying bit sequence (VBS) is transmitted from a transmitting device to a receiving device, wherein either the transmitted message is the challenge message containing the challenge bit sequence as the verifying bit sequence transmitted from the verifier as the transmitting device to the prover as the receiving device or the transmitted message is the response message containing the response bit sequence as the verifying bit sequence transmitted from the prover as the transmitting device to the verifier as the receiving device, wherein the transmitted message is encoded on a transmission signal and transmitted by the transmitting device, wherein a bit of the transmission message is transmitted in the transmission signal by a pulse with a pulse modulation parameter with two pulse states, wherein the receiving device receives a receiving signal containing the encoded transmitted message, wherein the receiving device detects the transmitted message in the receiving signal and decodes the verifying bit sequence from the receiving signal;

wherein the receiving device based on a transmission format of the transmitted message and based on the detected transmitted message in the receiving signal defines sub-periods in the receiving signal in which a first path of the pulse of the bits of the verifying bit sequence of the transmitted message are expected in the receiving signal; and the receiving device decodes a pulse state of a pulse of a bit of the verifying bit sequence based on the receiving signal received during one of the defined sub-periods belonging to the pulse to be decoded;

wherein the transmitted message contains a control bit sequence, wherein the receiving device determines a channel impulse response based on the control bit sequence of the transmitted message received with the receiving signal;

wherein the receiving device decodes the pulse state of the pulse to be decoded based on the receiving signal received during the defined sub-period belonging to the pulse to be decoded and based on a correction of inter pulse interference, wherein the correction of the inter pulse interference is determined on the basis of the channel impulse response determined; and wherein the correction of the inter pulse interference is determined on the basis of an influence of a channel impulse response of at least one previous pulse in the defined sub-period belonging to the pulse to be decoded.

2. Method according to claim 1, wherein the receiving device decodes the pulse state of the pulse to be decoded by giving the receiving signal received during the defined sub-period of the pulse to be decoded more weight than the receiving signal after the defined sub-period of the pulse to be decoded.

3. Method according to claim 1, wherein the receiving device decodes the pulse state of the pulse to be decoded by giving the receiving signal after the defined sub-period of the pulse to be decoded a weight of zero or the receiving device decodes the pulse state of the pulse to be decoded without considering the receiving signal after the defined sub-period of the pulse to be decoded.

4. Method according to claim 1, wherein a channel impulse response sub-period in which the first path of the channel impulse response is received is defined based on the determined channel impulse response, wherein the receiving device based on the transmission format of the transmitted message, based on the detected transmitted message in the receiving signal and based on the channel impulse response sub-period defines sub-periods in the receiving signal in which the first path of the pulse of the bits of the verifying bit sequence of the transmitted message are expected in the receiving signal.

5. Method according to claim 1, wherein the receiving device decodes the pulse state of the pulse to be decoded based on a corrected receiving signal during the defined sub-period, wherein corrected receiving signal during the defined sub-period is the receiving signal received during the defined sub-period belonging to the pulse to be decoded corrected by the correction of the inter pulse interference.

6. Method according to claim 1, wherein the transmitted message is encoded by a combined position modulation in which a bit is encoded by a symbol comprising a pulse either at a first position of the symbol or at a second position of the symbol, wherein the pulse of the symbol has the two pulse states, wherein the two pulse states are of another pulse modulation parameter.

7. Method according to claim 6, wherein for a symbol representing the bits of the verifying bit sequence, the receiving device defines a first sub-period in which the first path of the pulse is expected in the receiving signal, if transmitted at the first position of the symbol to be decoded, and a second sub-period in which the first path of the pulse is expected in the receiving signal, if transmitted at the first position of the symbol to be decoded, wherein the receiving device decodes the symbol by detecting the pulse of the symbol either in the first sub-period or in second sub-period and/or by decoding the pulse state of the pulse the symbol to be decoded based on the pulse state of the other pulse modulation parameter in the sub-period in which the pulse is detected.

8. Method according to the claim 7, wherein the receiving device decodes a bit value of the symbol to be decoded
- based on a position of pulse of another subsequent symbol and/or
- based on a pulse state of another subsequent symbol, and/or
- based on a position of a pulse and the other pulse modulation parameter of distinct symbols.

9. Method according to claim 6, wherein the transmitting device encodes a bit in the symbol, wherein a bit value of the symbol depends on
- a position of pulse of another subsequent symbol and/or
- a pulse state of another subsequent symbol, and/or
- a position of a pulse and a pulse state of a pulse of distinct symbols.

10. Method according to claim 1, wherein the verifier verifies the challenge bit sequence as the verifying bit sequence based on an error rate which is allowed for a positive verification result corresponding to a targeted security level.

11. Device for secure distance measurement being a prover or a verifier comprising:
- a receiver device configured to receive a receiving signal with a transmitted message encoded therein, wherein the transmitted message contains a verifying bit sequence, wherein a bit of the transmission message is transmitted in the transmission signal by a pulse with a pulse modulation parameter with two pulse states, and
- a decoder device configured to decode the verifying bit sequence from the transmitted message encoded in the receiving signal;

wherein the decoder device based on a transmission format of the transmitted message and based on the transmitted message detected in the receiving signal defines sub-periods in the receiving signal in which a first path of the pulse of the bits of the verifying bit sequence of the transmitted message (M) are expected in the receiving signal; and the decoder device decodes a pulse state of a pulse of a bit of the verifying bit sequence based on the receiving signal received during one of the defined sub-periods belonging to the pulse to be decoded;

wherein the transmitted message contains a control bit sequence, wherein the receiver device determines a channel impulse response based on the control bit sequence of the transmitted message received with the receiving signal;

wherein the receiver device decodes the pulse state of the pulse to be decoded based on the receiving signal received during the defined sub-period belonging to the pulse to be decoded and based on a correction of inter pulse interference, wherein the correction of the inter pulse interference is determined on the basis of the channel impulse response determined, and wherein the correction of the inter pulse interference is determined on the basis of an influence of a channel impulse response of at least one previous pulse in the defined sub-period belonging to the pulse to be decoded.

12. System comprising a prover and a verifier, wherein the verifier is configured for
  transmitting to the prover a challenge message comprising a challenge bit sequence;
  receiving from the prover a response message comprising a response bit sequence;
  verifying, in the verifier, the response message on the basis of the response bit sequence; and
  determining, in the verifier, a distance between the verifier and the prover on the basis of a time difference between the challenge message and the response message;

wherein the prover is configured for
  receiving the challenge message from the verifier;
  preparing a response bit sequence based on the challenge bit sequence;
  transmitting to the verifier the response message comprising the response bit sequence;

wherein the prover and/or the verifier is a device according to claim 11.

* * * * *